United States Patent
Cheng

(10) Patent No.: US 7,292,767 B2
(45) Date of Patent: Nov. 6, 2007

(54) LIGHT GUIDE PLATE AND BACK LIGHT SYSTEM USING SAME

(75) Inventor: Wen-Feng Cheng, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 318 days.

(21) Appl. No.: 10/949,755

(22) Filed: Sep. 24, 2004

(65) Prior Publication Data

US 2005/0094961 A1 May 5, 2005

(30) Foreign Application Priority Data

Oct. 31, 2003 (TW) ............................. 92130550 A

(51) Int. Cl.
*G02B 6/10* (2006.01)
(52) U.S. Cl. .................. 385/146; 362/26; 362/64; 362/65; 362/551; 362/561; 362/330; 362/339; 349/62; 385/901
(58) Field of Classification Search ............... 385/146, 385/901; 362/26, 561, 551, 64, 65, 330, 362/339; 349/62
See application file for complete search history.

(56) References Cited

U.S. PATENT DOCUMENTS

| | | | | |
|---|---|---|---|---|
| 5,040,098 A * | 8/1991 | Tanaka et al. | ............... | 362/26 |
| 5,046,826 A * | 9/1991 | Iwamoto et al. | ............... | 349/62 |
| 5,050,946 A * | 9/1991 | Hathaway et al. | ............ | 385/33 |
| 5,064,276 A * | 11/1991 | Endo et al. | ................ | 349/64 |
| 5,718,497 A * | 2/1998 | Yokoyama et al. | ........... | 362/26 |
| 5,886,759 A | 3/1999 | Mashino et al. | ............... | 349/65 |
| 6,011,602 A * | 1/2000 | Miyashita et al. | .......... | 362/615 |
| 6,196,691 B1 | 3/2001 | Ochiai | ......................... | 362/31 |
| 6,244,719 B1 * | 6/2001 | Oda et al. | ..................... | 362/26 |
| 6,672,733 B2 * | 1/2004 | Nagatani | .................... | 362/614 |
| 7,086,774 B2 * | 8/2006 | Katsuda et al. | ............. | 362/634 |
| 2004/0062030 A1 * | 4/2004 | Yamada et al. | ................ | 362/31 |
| 2004/0202436 A1 * | 10/2004 | Cho et al. | ................... | 385/141 |

FOREIGN PATENT DOCUMENTS

| | | |
|---|---|---|
| JP | P2003-084140 | 3/2003 |
| JP | P2003-272426 | 9/2003 |

* cited by examiner

*Primary Examiner*—Frank G. Font
*Assistant Examiner*—James P. Hughes
(74) *Attorney, Agent, or Firm*—Morris Manning Martin LLP; Tim Tingkang Xia, Esq.

(57) ABSTRACT

A back light system (2) includes a light guide plate (20) and light sources (21). The light guide plate includes an optical output surface (203), a bottom surface (202) opposite to the output surface, and optical input surfaces (201) between the output and bottom surfaces. The light sources are positioned adjacent the input surfaces respectively. A thickness of a middle of the light guide plate is less than a thickness of a periphery of the light guide plate. In operation, light beams from two opposite of the light sources provide ample optical energy to a middle area of the output surface. In addition, a total optical energy at peripheral areas of the output surface is the same as or similar to a total optical energy at the middle area of the output surface. Thus, the back light system provides very high and highly uniform brightness for an associated LCD.

9 Claims, 2 Drawing Sheets

LIGHT GUIDE PLATE AND BACK LIGHT SYSTEM USING SAME

BACKGROUND OF THE INVENTION

1. Field of the Invention

The present invention relates to light guide plates and back light systems using the light guide plates, and especially to such light guide plates and back light systems used in liquid crystal displays (LCDs).

2. Description of the Prior Art

Most portable electronic devices such as laptop and notebook computers, mobile phones and game devices have viewing screens unlike the cathode-ray-tube (CRT) monitors of conventional desktop computers. Users expect the viewing screens to provide performance equal to that of CRT monitors. To meet this need, computer manufacturers have sought to build flat panel displays (FPDs) offering superior resolution, color and contrast, while at the same time requiring minimal power consumption. LCDs are one type of FPD which satisfy these expectations. However, the liquid crystals of an LCD are not self-luminescent. Rather, the LCD needs a back light system which offers sufficient luminance (brightness) in a wide variety of ambient light environments.

A light guide plate is a key component of the back light system used in an LCD. Typically, the light guide plate has either of two shapes: a sheet having a uniform thickness ("planar"), or a wedge-shaped sheet ("wedgy"). Both these light guide plates convert a point light source or a linear light source into a surface light source. Generally, the planar light guide plate needs a plurality of pattern-dots on a bottom surface thereof, in order to disable partially total internal reflection of light beams and to provide more uniform brightness. The pattern-dots need to be accurately designed, which usually requires numerous optical simulations. Further, the accurately designed pattern-dots are difficult to produce. Unlike the planar light guide plate, the wedgy light guide plate has a bottom surface oblique to a light input surface. The bottom surface can eliminate total internal reflection of at least some of the light beams traveling from the input surface, without the need for pattern-dots. If pattern-dots are provided on the bottom surface of the wedgy light guide plate, they are an "optional extra" to enhance uniform brightness and the elimination of total internal reflection. Therefore the pattern-dots do not need to be very accurately designed, and they are relatively easy to produce.

As shown in FIG. 5, a conventional back light system 1 comprises a light source 11 and a wedgy light guide plate 10. The light source 11 is a cold cathode fluorescent lamp (CCFL). The light guide plate 10 comprises a light output surface 103, a bottom surface 102 opposite to the output surface 103, and a light incident surface 101 and three side surfaces (not labeled) interconnecting the output surface 103 and the bottom surface 102. A plurality of pattern-dots (not shown) is provided on the bottom surface 102.

In operation, light beams emitted from the light source 11 enter the light guide plate 10. Some of the light beams are reflected and then exit through the output surface 103, and other light beams directly exit through the output surface 103. As shown, relatively few light beams can reach an area of the output surface 103 that is far away from the light incident surface 101. Optical energy at an area of the output surface 103 that is most distal from the incident surface 101 is significantly reduced. Thus, even with the pattern-dots on the bottom surface 102, the back light system 1 has the disadvantage of uneven brightness. Furthermore, the back light system 1 has only one CCFL providing optical beams. The optical beams undergo partial loss when passing through other optical elements (not shown) of an associated LCD. Accordingly, the back light system 1 yields relatively low brightness for the LCD.

SUMMARY OF THE INVENTION

Accordingly, an object of the present invention is to provide a light guide plate which is easy to design and produce, and which yields high and uniform brightness.

Another object of the present invention is to provide a back light system which yields high and uniform brightness for an associated LCD.

To achieve the first of the above objects, a light guide plate in accordance with a preferred embodiment of the present invention includes an optical output surface, a bottom surface, and four optical input surfaces. The bottom surface is opposite to the output surface. The input surfaces interconnect the output surface and bottom surface. A thickness of a middle of the light guide plate is less than a thickness of a periphery of the light guide plate.

To achieve the second of the above objects, a back light system comprises a light guide plate and light sources. The light guide plate comprises an optical output surface, a bottom surface opposite to the output surface, and optical input surfaces between the output surface and the bottom surface. The light sources are positioned adjacent the input surfaces respectively. A thickness of a middle of the light guide plate is less than a thickness of a periphery of the light guide plate.

Because the thickness of the middle of the light guide plate is less than the periphery thereof, light beams from two opposite of the light sources provide ample optical energy to a middle area of the output surface. Moreover, the intensities of the light beams from the two opposite light sources are complementary to each other. That is, a total optical energy at peripheral areas of the output surface is the same as or similar to a total optical energy at the middle area of the output surface. Thus the light guide plate yields highly uniform brightness, and the back light system provides highly uniform brightness for an associated LCD. In addition, because more than one light sources is used, the back light system has very high brightness.

Other objects, advantages and novel features of the present invention will be apparent from the following detailed description of preferred embodiments thereof with reference to the attached drawings, in which:

DETAILED DESCRIPTION OF THE PREFERRED EMBODIMENTS

Figure 1:
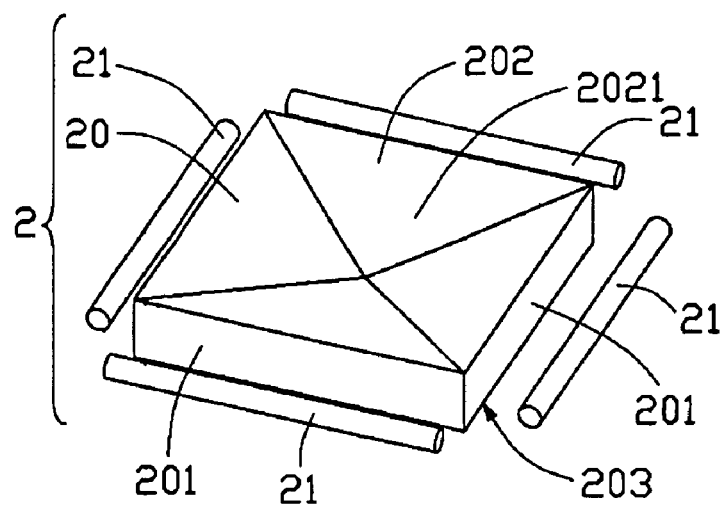
FIG. 1 is an isometric, inverted view of a back light system comprising four light sources and a light guide plate constructed in accordance with the preferred embodiment of the present invention.

Referring to FIG. 1, a back light system 2 in accordance with a preferred embodiment of the invention comprises four light sources 21 and a plate-like light guide member 20. The light sources 21 are stationed at four sides of the light guide plate 20 respectively. Light from the light sources 21 enters four optical input surfaces 201 of the light guide plate 20.

Figure 4:
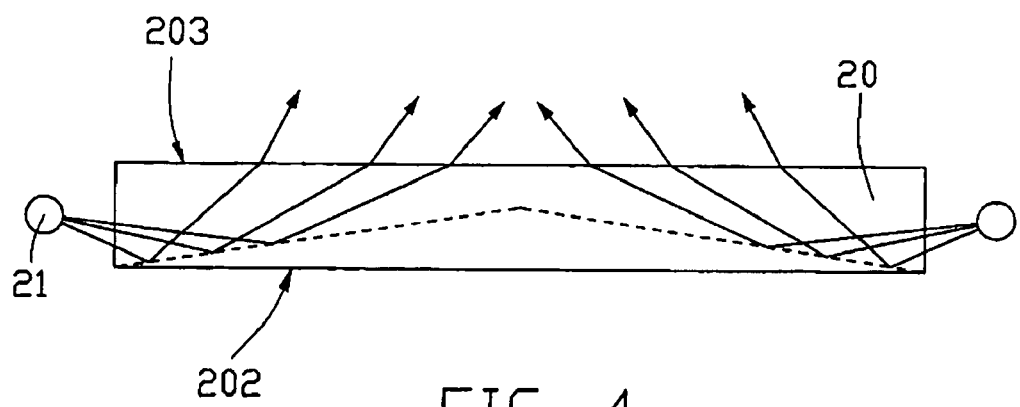
FIG. 4 is an enlarged, side plan view of the light guide plate and two of the light sources of FIG. 1, showing essential optical paths thereof.
Figure 5:
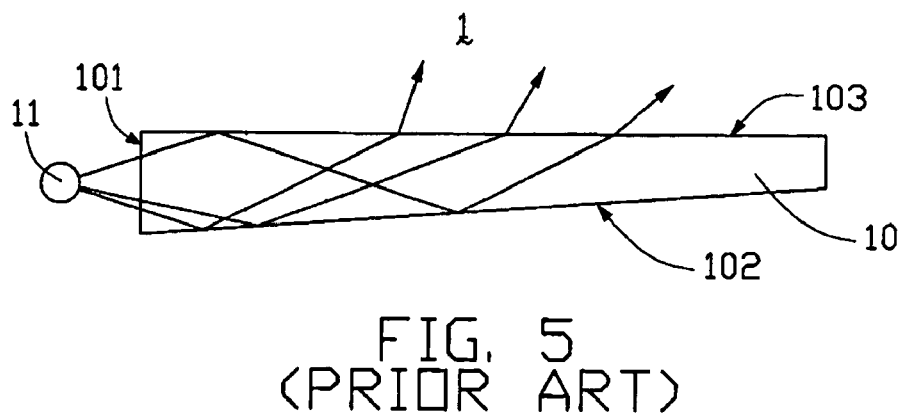
FIG. 5 is a side plan view of a conventional back light system, showing essential optical paths thereof.

Each light source 21 is typically a linear source or a plurality of point sources which transmit(s) scattered light beams, as shown in FIG. 4. In the preferred embodiment, the light source 21 is a cold cathode fluorescent lamp (CCFL). Alternatively, the light source 21 can be one or more light emitting diodes (LEDs).

The light guide plate 20 is substantially a rectangular sheet indented at a bottom thereof. A thickness of a middle of the light guide plate 20 is less than a thickness of a periphery of the light guide plate 20, and the thickness of the light guide plate 20 progressively decreases from the periphery thereof to the middle thereof. The light guide plate 20 comprises an optical output surface 203, a bottom surface 202 opposite to the output surface 203, and the four input surfaces 201. The input surfaces 201 are adjacent the light sources 21, and interconnect the output surface 203 and the bottom surface 202. Typically, for the purpose of emitting light more uniformly from the output surface 203, a plurality of reflective pattern-dots (not shown) is integrally formed on the bottom surface 202. To improve the efficiency of optical performance, reflective sheets or films (not shown) can be secured on the bottom surface 202. The use of the reflective sheets or films ensures that virtually all the light beams from the light sources 21 are emitted from the output surface 203.

Figure 2:
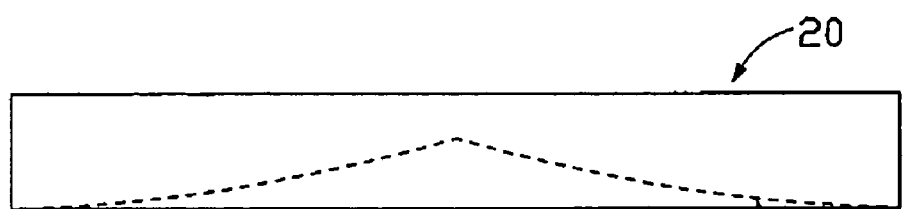
FIG. 2 is an enlarged, side plan view of an alternative embodiment of a light guide plate for use in the back light system of FIG. 1.
Figure 3:
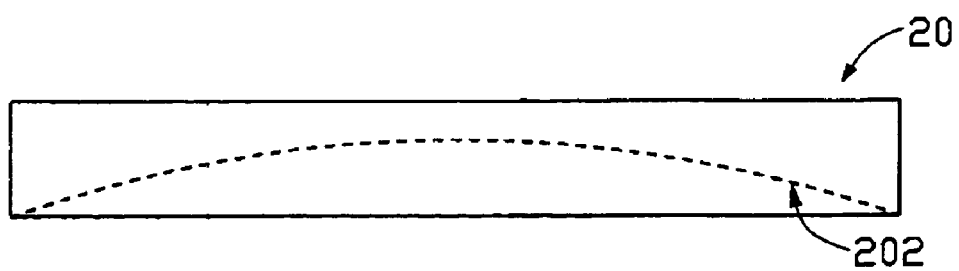
FIG. 3 is an enlarged, side plan view of a further alternative embodiment of a light guide plate for use in the back light system of FIG. 1.

The output surface 203 is flat. The bottom surface 202 comprises a plurality of interconnecting sub-surfaces 2021. The sub-surfaces 2021 may be oblique planar surfaces (see FIG. 1), concave surfaces, or convex surfaces (see FIG. 2). Each sub-surface 2021 forms an angle or series of angles slightly less than 90 degrees relative to the corresponding input surface 201. Alternatively, the bottom surface 202 may comprise only a single surface such as a concave surface (see FIG. 3).

Turning to FIG. 4, in operation, light beams emitted from the light sources 21 reach the input surfaces 201 and enter the light guide plate 20. Some of the light beams are reflected and then exit through the output surface 203, and other light beams directly exit through the output surface 203. As shown, because the thickness of the light guide plate 20 progressively decreases from the periphery thereof to the middle thereof, light beams from two opposite of the light sources 21 provide ample optical energy to the middle area of the output surface 203. In addition, the intensities of the light beams from the two opposite light sources 21 are complementary to each other. That is, a total optical energy at peripheral areas of the output surface 203 is the same as or similar to a total optical energy at the middle area of the output surface 203. Thus, the back light system 2 provides highly uniform brightness. Moreover, because more than one light source 21 is used, the back light system 2 has very high brightness.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A back light system comprising:
a light guide plate comprising a flat optical output surface configured for emitting light, a bottom surface opposite to the optical output surface and configured for reflecting light to subsequently transmit through the optical output surface, and optical input surfaces adjoining the optical output surface and the bottom surface, the optical input surfaces being configured for receiving light; and
light sources positioned adjacent the optical input surfaces respectively;
wherein the bottom surface is indented, a thickness of a center portion of the light guide plate is less than a thickness of a periphery of the light guide plate, and the periphery surrounds the center portion.

2. The back light system as described in claim 1, wherein the thickness of the light guide plate progressively decreases from the periphery thereof to the center portion thereof.

3. The back light system as described in claim 1, wherein the bottom surface comprises a plurality of interconnecting sub-surfaces.

4. The back light system as described in claim 3, wherein each of the sub-surfaces forms an angle or angles slightly less than 90 degrees relative to a corresponding optical input surface of the light guide plate.

5. The back light system as described in claim 4, wherein the sub-surfaces are planar, concave, or convex.

6. A back light system comprising:
a light guide member comprising a flat optical output surface configured for emitting light, a bottom surface opposite to the optical output surface and configured for reflecting light to subsequently transmit through the optical output surface, and optical input surfaces adjoining the optical output surface and the bottom surface, the optical input surfaces being configured for receiving light; and
light sources positioned adjacent the optical input surfaces respectively;
wherein the bottom surface is recessed, a center of the bottom surface is spaced from each of the optical input surfaces and is cooperatively surrounded by the optical input surfaces, and the light guide member is thicker at portions of the bottom surface nearer to the surrounding optical input surfaces than at the center of the bottom surface.

7. The back light system as described in claim 6, wherein the bottom surface comprises a plurality of interconnecting sub-surfaces.

8. The back light system as described in claim 7, wherein each of the sub-surfaces forms an angle or angles slightly less than 90 degrees relative to a corresponding optical input surface of the light guide member.

9. The back light system as described in claim 7, wherein the sub-surfaces are planar, concave, or convex.

* * * * *